Patented May 12, 1942

2,282,789

UNITED STATES PATENT OFFICE 2,282,789

STABILIZED FOOD PRODUCT

Sidney Musher, New York, N. Y., assignor to Musher Foundation Incorporated, New York, N. Y., a corporation of New York No Drawing. Application March 11, 1942, Serial No. 434,204

8 Claims. (Cl. 99—11)

The present invention relates to the preparation of a stabilized vitamin containing food product and more particularly to the stabilization of fat soluble vitamin containing oils or oil soluble vitamins whereby they are substantially protected against oxidative deterioration and loss of their vitamin values.

The fish and fish liver oils including cod liver oil, halibut liver oil, tuna liver oil, herring oil, salmon oil, menhaden oil, sardine oil, shark liver oil, etc., as well as their fat soluble vitamin concentrates including largely the unsaponifiable fraction extracted or removed therefrom are all highly subject to oxidative deterioration, loss of vitamin A content and the development of rancidity.

In addition to vitamin A and the oils containing this fat soluble vitamin, its pro-vitamin carotene as well as oils in which it occurs such as alfalfa oil or extracts of the cereal grasses or other fodder and forage legumes and grasses and also the oils extracted from carrots and other vegetable plant materials high in carotene are readily subject to oxidative deterioration.

The other fat soluble vitamins which are similarly subject to deterioration upon standing or upon exposure to air include activated ergosterol or calciferol as one of the forms of vitamin D, as well as vitamin $D_2$ and also vitamin $D_3$ or 7-dehydro cholesterol together with other forms of vitamin D either in their pro-vitamin or natural forms and whether produced synthetically or extracted by solvents or other special means, vitamin E or alpha-tocopherol and vitamin K including $K_1$ and $K_2$, whether extracted from natural sources such as by removal of the oil soluble substances present in alfalfa, cereal grasses, etc. and also the synthetic oil soluble vitamin product such as 1.4-naphthaquinone, and similar quinones.

These fat soluble vitamins which may be present either in substantially pure condition or dissolved in oil or which may be extracted from a natural source by removal of the glyceride oils as well as oil soluble vitamins from these substances or which may be prepared by special procedures such as by removal of the unsaponifiable fraction from the fish and fish liver oils are all readily subject to deterioration particularly when subjected to contact with water or when exposed to air.

These products have also been found to be subject to oxidation very readily when used in connection with the preparation of various minerals, particularly copper, and also when prepared in emulsified form where the fat globule or the water insoluble vitamin is surrounded with moisture that would tend to promote oxidation and loss of vitamin value.

For example, when these oils or fat soluble vitamins are incorporated in emulsified form in water, each of the globules of the oil is directly contacted with the water and hydrolysis and oxidation take place very rapidly under these circumstances.

It has now been found that emulsions and aqueous dispersions of these oil soluble vitamin compositions may be prepared which will be highly stable and which will not only tend to maintain the vitamin potency but will retard oxidative deterioration and rancidity and tend to render them even more stable to oxidative deterioration than if they were kept in substantially pure condition and not in the aqueous dispersion.

It has been found that the stabilizing effect of the present invention may be obtained by dispersing or emulsifying these vitamin containing fish and fish liver and other oil compositions in aqueous concentrated caramelized milk-solids-not-fat and particularly in aqueous concentrated caramelized whey.

Apparently the caramelized milk-solids-not-fat and particularly whey contains the proper proportion of ingredients so that when these vitamin containing oil compositions are dispersed thoroughly in or preferably emulsified with the caramelized milk solids, the oil soluble vitamins are rendered substantially stabilized against oxidative deterioration.

The whey as particularly utilized in accordance with the present invention is obtained from the manufacture of cheese and is the material drawn off after the milk has been curdled with rennet, for example, and after the curd has formed the proper degree of hardness. Of particular importance for use is the whey that is obtained from the manufacture of cottage cheese, whereby coagulation is effected by natural souring and the liquid has been heated nearly to boiling. The whey is desirably further treated in order to remove a portion of the lactose, the lactose being allowed to crystallize out.

The whey is substantially free of lactose and of fat and will contain about 70% to 75% of lactose and 10% to 15% protein, the protein being substantially free of casein and being present in the form of milk albumin.

This de-sugared whey, after a portion of the lactose has been allowed to crystallize out, will contain about 35% to 45% protein in the form of albumin and about 13% to 17% total ash, based upon the solids weight of the whey.

Apparently in the production of the whey, antioxygenic action is materially enhanced and it appears as if the reduction in the lactose content is desirable to obtain the full antioxygenic effect.

The whey may then be subjected to a temperature of at least about 220° F. and preferably to 235° F. to 245° F. for about 15 to 30 minutes or more at some stage in its processing whereby the whey is caramelized. The caramelization process develops the protective effect and unless the whey or other milk-solids-not-fat have been subjected to this caramelization step, the desirable results of the present invention are not secured.

The whey or other similar milk solids is desirably adjusted to a pH of about 4 to 6 and preferably to a pH of about 5 before caramelizing or subjecting to the elevated temperature treatment.

The concentrated or condensed caramelized milk-solids-not-fat are used as the aqueous medium through which the vitamin containing oil composition is dispersed in a minor amount, the vitamin oil occupying the discontinuous phase.

The caramelized milk-solids-not-fat are first concentrated to at least 20% to 25% total solids before the vitamin oil is emulsified in them. The caramelization of the milk solids may take place prior to or after the emulsification of the oil therein.

For example, whey may be evaporated under reduced pressure to about 25% solids content. The whey may then be subjected to carmelization at about 245° F. for 30 minutes and, following the caramelization of the whey, the cod liver oil or other similar oil may be emulsified or finely dispersed in the carmelized whey.

The vitamin containing oil may be added to the concentrated or condensed caramelized whey or similar caramelized milk solids in any minor amount, but it is preferable to add less than 15% of the vitamin oil to the concentrated caramelized milk solids and for the oil to be thoroughly emulsified or dispersed in the milk solids. It is important that the oil occupy the disperse continuous phase and the concentrated caramelized milk solids occupy the continuous aqueous phase in order to obtain the desirable results of the present invention.

In addition to using whey as the source of milk-solids-not-fat, other aqueous dispersions of milk solids may also be employed including particularly concentrated buttermilk where at least a portion of the lactose has been converted to lactic acid.

There may also be utilized evaporated buttermilk containing about 25% to 30% total solids, condensed or semi-solid buttermilk containing about 25% to 35% total solids, dried buttermilk rendered aqueous by dilution, skim milk in concentrated condition, whole milk, whey residue or other similar forms of milk-solids-not-fat, all in caramelized condition.

Where the milk-solids-not-fat are first obtained in a substantially dry condition, a sufficient amount of water is added in order to render the milk solids substantially plastic and capable of taking the vitamin oil in the disperse phase thereof. When the fish oil is thereupon dispersed or emulsified in the milk solids, the milk solids should occupy the aqueous continuous phase and the vitamin containing oil the disperse phase and a sufficient amount of water should be present so that this dispersion is possible.

Where, for example, powdered skim milk is employed, the powdered skim milk may first be combined with from 4 to 5 parts of water, then caramelized and the vitamin containing oil such as fish or fish liver oil concentrate may then be emulsified in the aqueous caramelized skim milk to obtain the enhanced stabilizing effects.

Where dried skim milk is employed as indicated above, the skim milk before having been subjected to the final drying operation and while still in aqueous condition, is desirably caramelized at about 235° F. to 245° F. or more.

Another method that may be carried out is for the vitamin oil to be emulsified in the concentrated milk solids and for the combination to be subjected to the caramelization or heating step to produce the caramelized product whereby enhanced stabilization is obtained.

It has been found of particular importance for the caramelized whey or similar caramelized milk solids to contain at least about 20% to 25% total solids before incorporating the vitamin oil therein, but these milk solids must be sufficiently aqueous so as to obtain a proper dispersion of the oil in the aqueous continuous medium of the caramelized milk solids.

After the vitamin oil has been emulsified in the aqueous milk solids, so that the oil occupies the discontinuous phase, the resultant product may further be evaporated or concentrated or may be completely dried.

The vitamin oil may be emulsified in the course of the drying of the whey, provided the vitamin oil occupies the discontinuous or disperse phase and is added to the whey while the whey is in substantially aqueous caramelized condition.

Although a thorough admixture of the vitamin oil in the caramelized milk solids is sufficient to produce markedly improved stability, homogenization or other similar processing such as by placing the combination through a colloid mill which would more thoroughly produce contact between the oil globules and the caramelized whey will give even greater stabilizing action. This result is particularly unusual since it is normally to be expected that the oil globules in contact with the water of the caramelized whey would be rendered much more unstable than if they were not in contact with such aqueous products.

During the homogenization of the vitamin oil in the caramelized milk-solids-not-fat, it is particularly desirable for the homogenization to take place at a slightly elevated temperature such as over about 180° F. and preferably at between 200° F. to 210° F. or more. Apparently an enhanced stabilization takes place where the homogenization is permitted to proceed at the elevated temperature.

There may be utilized not only single oil soluble vitamin compositions such as concentrates containing vitamin A or carotene alone, but also combinations of these various oil soluble vitamins including those which contain vitamin A, vitamin D or vitamins A, D and K, etc.

There may furthermore be utilized the various synthetic fat soluble vitamin compositions even though these are not chemically identical with the natural product, but which nevertheless have similar physiological functions and which are also subject to oxidative deterioration.

In the case of vitamin E, this may be utilized either as alpha-tocopherol or in the form of wheat germ oil, for example, which may be extracted or expelled from wheat germs.

Similar extracts may also be prepared by solvent extraction as by the use of hexane or similar oil solvents from other cereal germs, grasses or polishes known to be high in these fat soluble vitamins.

There may also be utilized the water insoluble or oil soluble vitamins which may be removed from the forage legumes or forage grasses including alfalfa, red clover, spring vetch, winter vetch, soya beans, and particularly their leaves and stalks and also as contained in the cereal grasses such as in maize, sorghum, rye, oats, June grass and timothy and their leaves and stalks.

These various forage and fodder legumes and grasses may, for example, be extracted by the use of a fat soluble solvent such as hexane or extracted in a series of organic solvent extraction procedures in order to obtain either the fat soluble vitamins which may be dispersed in the glyceride oils normally contained in these various compositions or the substantially pure fat soluble vitamins which may be freed from the glyceride oils in which they are soluble.

Any of these vitamin compositions or fish or fish liver oils and unsaponifiable fractions removed therefrom may be utilized for dispersion in a major amount of concentrated caramelized milk-solids-not-fat in accordance with the present invention.

In the case of the vitamin containing glyceride oils which may be dispersed in the concentrated caramelized milk-solids-not-fat there may be utilized dependent upon the vitamin concentration, portions as high as 35% to 40% of oil against the weight of the concentrated caramelized milk-solids-not-fat, but in any event a minor amount of the vitamin containing glyceride oil is utilized and desirably 25% or less is dispersed through the caramelized milk solids.

Where the oil soluble vitamin composition is in substantially pure form, it may be dispersed in a very minor amount such as less than 5% against the weight of the concentrated caramelized milk solids.

Following dispersion or homogenization of these vitamin containing oils in the concentrated caramelized milk solids, the final product may be dried, preferably under reduced pressure or in the presence of an inert gas.

The combination may also be placed through an homogenizer or colloid mill under vacuum or under inert gas in order to prevent the inclusion of air during the dispersion of the vitamin containing oil in the concentrated caramelized milk solids.

After dispersion of the vitamin containing oil in the concentrated milk solids, the combined product may be dried by admixing in a minor proportion with a major proportion of various meals and flour compositions. Among these compositions there are included the brans, particularly wheat and corn bran, oats, rye, soya bean flour, alfalfa and cereal grasses. It is particularly desirable for the combination of the dispersed vitamin product and the bran or soya bean meal to be placed under reduced pressure and at a slightly elevated temperature in order to obtain a perfectly dry product without the use of excessively high temperatures or long time drying procedures.

Particularly where the dispersed vitamin combination is to be dried by combining with a bran, particularly wheat bran, the bran is desirably first pre-dried to less than 2% total moisture content and then combined with the caramelized milk solids containing the vitamin oil dispersed therein.

For example, wheat bran normally containing about 10% to 12% total moisture may be dried to less than 2% total moisture content by placing in a revolving drum with agitators and at a temperature of 150° F. to 160° F. or higher and after the wheat bran has been dried to less than 2% total moisture content, there may be added to it a minor proportion, preferably less than 35% and desirably less than 25% of the concentrated caramelized milk solids containing in disperse form the vitamin oil composition. The vitamin oil dispersion will thereupon be absorbed into the particles of the bran to form a homogeneous, dry mass which may be ground or more finely divided where desired.

Even though the concentrated caramelized milk solids are dried on the surface of the bran particles whereby they would under normal conditions be exposed to large contact with air and oxidation, nevertheless where the bran is pre-dried in the aforesaid manner and then combined with the vitamin oil dispersion, the finished product is not only obtained in dry, finely divided form, but is also stabilized against oxidative deterioration.

In addition to the brans such as wheat, corn and oat bran which may be pre-dried in this manner and then combined with the dispersion, the high protein containing materials may also be pre-dried including soya bean flour and powdered skim milk.

Together with or in lieu of the ordinary forms of milk-solids-not-fat that may be utilized in accordance with the present invention in caramelized condition, there may also be utilized the extracts of the caramelized milk solids such as those obtained by the use of alcohol including methyl alcohol, ethyl alcohol, isopropyl alcohol and other similar organic solvents.

Among the different products that may be prepared in accordance with the present invention are the following:

1. 10% of cod liver oil concentrate is added to condensed caramelized whey containing about 30% total whey solids. The cod liver oil concentrate is emulsified in the concentrated whey by placing the combination through a colloid mill.

2. Plastic caramelized buttermilk containing about 30% total solids is emulsified with 10% of a vitamin containing fish oil and the combination is then put through an homogenizer. The combination is then drum dried.

3. 5% of fish liver oil vitamin concentrate is added to and emulsified in condensed caramelized skim milk having over 20% total solids. Before the addition of the fish liver oil concentrate, the condensed skim milk had been heated to 246° F. for 30 minutes under pressure to caramelize.

4. Whey is condensed to over 20% total solids. The whey is then caramelized at 250° F. for 1 hour. 10% of cod liver oil is added to the caramelized whey and emulsified in it. The finished combination is then drum dried.

5. Caramelized skim milk is condensed to over 20% total solids. A vitamin A or carotene containing oil is dispersed through the concentrated caramelized skim milk by placing through a colloid mill, preferably under reduced pressure.

The dispersion of the vitamin containing oil in the concentrated caramelized milk solids may also be added to three to five times its weight of wheat bran or similar carrier material and thoroughly admixed therewith under reduced pressure and at a slightly elevated temperature of about 150° F. until the combination is thoroughly dried without first pre-drying.

As a preferable procedure, however, the bran is pre-dried to less than about 2% total moisture content and then combined with 10% to 25% of its weight of the dispersion of the vitamin containing oil in the concentrated caramelized milk solids and so that the final product will contain not in excess of about 12% total moisture content.

To the caramelized milk-solids-not-fat there may also be added a small amount of lecithin or other phosphatides, phosphoric acid, aliphatic polycarboxylic acids such as tartaric acid, citric acid, succinic acid, etc., and also molasses, particularly blackstrap molasses.

For example, a combination of from 25% to 75% of condensed caramelized milk-solids-not-fat and 75% to 25% of blackstrap molasses may be prepared and utilized as the aqueous continuous phase in which cod liver oil or similar fish or other vitamin oil is dispersed or emulsified.

The fat soluble vitamin containing oils may also be utilized when distributed or dissolved in castor oil, refined white mineral oil as well as in glyceride oils and fats other than those in which they naturally occur. These various oils may thereupon be utilized for dispersion through concentrated caramelized milk solids in accordance with the procedure of the present invention.

The present application is a continuation in part of application Serial No. 331,185 filed April 23, 1940. Through said continuing application the present application is a continuation in part of application Serial No. 239,319 filed November 7, 1938 now Patent 2,198,215 and Serial No. 317,175 filed February 3, 1940, now Patent 2,198,218.

Having described my invention, what I claim is:

1. A substantially stabilized food product comprising a dispersion of a minor amount of an oil soluble vitamin containing composition in a major amount of concentrated caramelized milk-solids-not-fat, said oil soluble vitamin containing composition being substantially stabilized against oxidative deterioration.

2. A substantially stabilized food product comprising a dispersion of a minor amount of an oil soluble vitamin concentrate in a major amount of concentrated caramelized milk-solids-not-fat, said oil soluble vitamin concentrate being substantially stabilized against oxidative deterioration.

3. A substantially stabilized food product comprising a dispersion of a minor amount of a vitamin containing glyceride oil in a major amount of concentrated caramelized milk-solids-not-fat, said vitamin containing glyceride oil being substantially stabilized against oxidative deterioration.

4. A substantially stabilized food product comprising a dispersion of a minor amount of a vitamin containing fish oil in a major amount of concentrated caramelized milk-solids-not-fat, said vitamin containing fish oil being substantially stabilized against oxidative deterioration.

5. A substantially stabilized food product comprising a dispersion of a minor amount of an oil soluble vitamin containing fish oil concentrate in a major amount of concentrated caramelized milk-solids-not-fat, said oil soluble vitamin containing fish oil concentrate being substantially stabilized against oxidative deterioration.

6. A method of producing stable food products which comprises dispersing a minor amount of an oil soluble vitamin containing composition in a major amount of concentrated caramelized milk-solids-not-fat, whereby the oil soluble vitamin containing composition is substantially stabilized against oxidative deterioration.

7. A method of producing stable food products which comprises dispersing a minor amount of an oil soluble vitamin concentrate in a major amount of concentrated caramelized milk-solids-not-fat, whereby the oil soluble vitamin concentrate is substantially stabilized against oxidative deterioration.

8. A method of producing stable food products which comprises dispersing a minor amount of an oil soluble vitamin containing composition in a major amount of concentrated caramelized milk-solids-not-fat, and then drying, whereby the oil soluble vitamin containing composition is substantially stabilized against oxidative deterioration.

SIDNEY MUSHER.